United States Patent
Tyagi et al.

(10) Patent No.: US 10,698,477 B2
(45) Date of Patent: Jun. 30, 2020

(54) EMPLOYING HEADSET MOTION DATA TO DETERMINE AUDIO SELECTION PREFERENCES

(71) Applicant: Motorola Mobility LLC, Chicago, IL (US)

(72) Inventors: Vivek Tyagi, Chicago, IL (US); Sudhir Vissa, Bensenville, IL (US)

(73) Assignee: Motorola Mobility LLC, Chicago, IL (US)

( * ) Notice: Subject to any disclaimer, the term of this patent is extended or adjusted under 35 U.S.C. 154(b) by 467 days.

(21) Appl. No.: 15/254,547

(22) Filed: Sep. 1, 2016

(65) Prior Publication Data

US 2018/0059778 A1     Mar. 1, 2018

(51) Int. Cl.
*G06F 3/01*     (2006.01)
*G06F 3/16*     (2006.01)
*H04R 1/10*     (2006.01)

(52) U.S. Cl.
CPC .............. *G06F 3/012* (2013.01); *G06F 3/165* (2013.01); *H04R 1/1041* (2013.01); *H04R 2420/07* (2013.01); *H04R 2430/01* (2013.01); *H04R 2460/07* (2013.01); *H04R 2499/11* (2013.01); *H04S 2400/01* (2013.01); *H04S 2420/01* (2013.01)

(58) Field of Classification Search
CPC .......... G06F 3/012; G06F 3/162; G06F 3/165; H04R 1/1041; H04R 2420/1041; H04R 2499/11

USPC .......................................................... 381/74
See application file for complete search history.

(56) References Cited

U.S. PATENT DOCUMENTS

| | | | | |
|---|---|---|---|---|
| 2008/0228299 A1* | 9/2008 | Ikeda | ................... | G11B 27/105 700/94 |
| 2012/0002822 A1* | 1/2012 | Peissig | .................... | G06F 3/012 381/74 |
| 2012/0114132 A1* | 5/2012 | Abrahamsson | ...... | H04R 1/1016 381/74 |
| 2015/0304790 A1* | 10/2015 | Yamashita | .............. | G06F 21/32 381/303 |
| 2017/0339484 A1* | 11/2017 | Kim | ..................... | H04R 1/1041 |

FOREIGN PATENT DOCUMENTS

EP     2293598 A2 *    3/2011    ............. G06F 3/012
JP     2000194460 A *    7/2000

* cited by examiner

*Primary Examiner* — David L Ton
(74) *Attorney, Agent, or Firm* — Amerson Law Firm, PLLC

(57) ABSTRACT

A method includes receiving headset motion data over a headset interface of a device while playing an audio selection on the device. A preference indicator for the audio selection is generated based on the headset motion data. A device includes a headset interface and a processor coupled to the headset interface. The processor is to receive headset motion data over the headset interface while playing an audio selection over the headset interface and generate a preference indicator for the audio selection based on the headset motion data.

22 Claims, 2 Drawing Sheets

EMPLOYING HEADSET MOTION DATA TO DETERMINE AUDIO SELECTION PREFERENCES

BACKGROUND

Field of the Disclosure

The disclosed subject matter relates generally to mobile computing systems and, more particularly, to employing headset motion data to determine a preference of a user regarding an audio selection being played.

Description of the Related Art

Users of mobile devices often employ headsets when engaging in activities such as listening to music. Wireless headsets allow users to enjoy the music even when physically separated from the mobile device. The device may be across the room or stowed in a pocket or handbag. In some applications, a user may specify preferences regarding particular audio selections. Preference data may be used to generate playlists for the user or to generate music streams with selections similar to those preferred. Audio selections that are not preferred can be omitted from the playlist or stream. However, to specify preferences, the user typically needs to physically interact with the mobile device to press a "like" or "dislike" icon on the display. Specifying preferences in this manner interrupts the music experience and might require the user to physically retrieve the device from a distant or stowed location. As a result, the user may tend to abstain from designating preferences regarding audio selections in some situations to avoid disrupting the experience, resulting in missed data points.

The present disclosure is directed to various methods and devices that may solve or at least reduce some of the problems identified above.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF EMBODIMENT(S)

Figure 1:
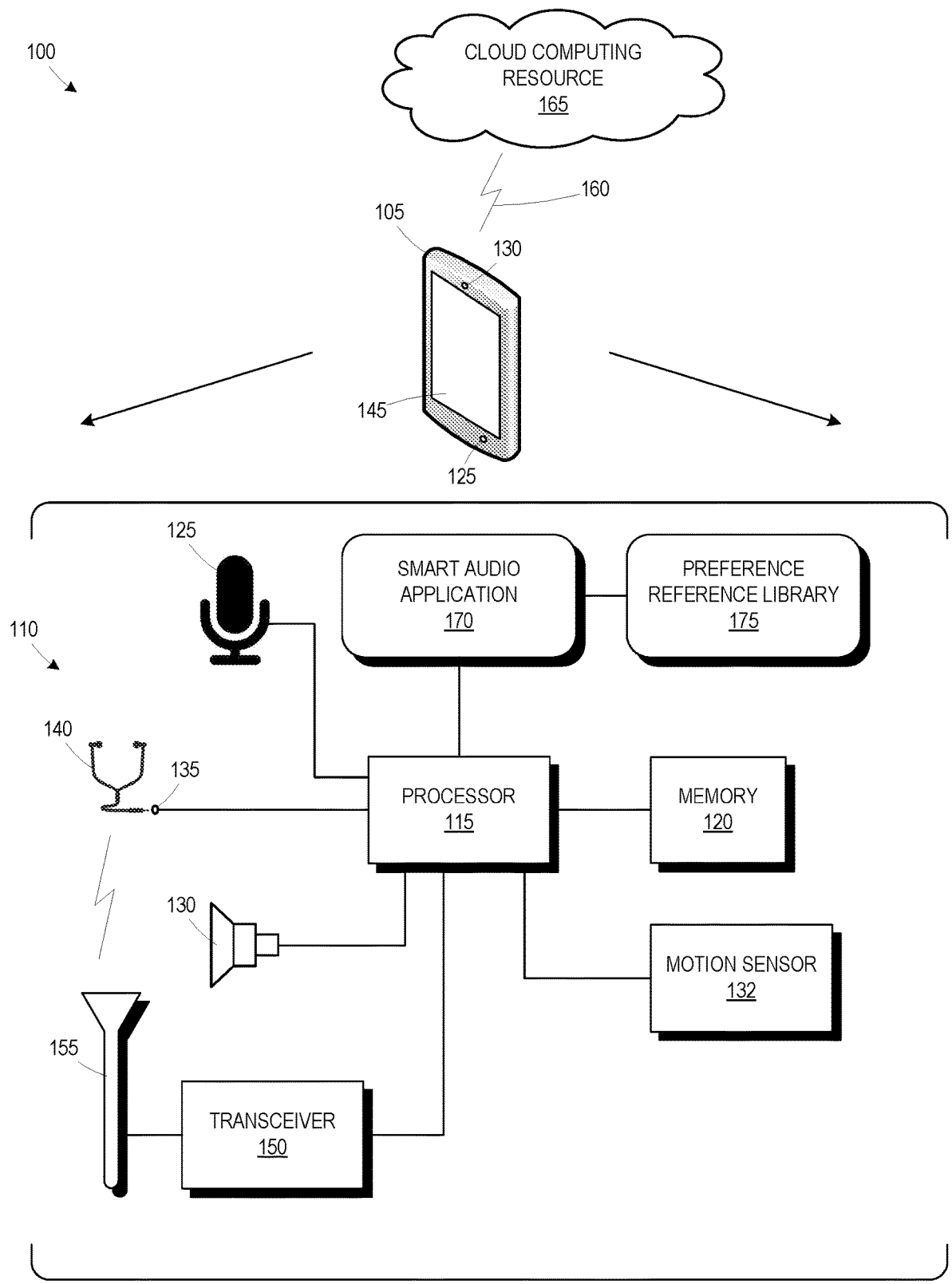
FIG. 1 is a simplified block diagram of a communication system for determining audio selection preferences using headset motion data, according to some embodiments disclosed herein.
Figure 2:
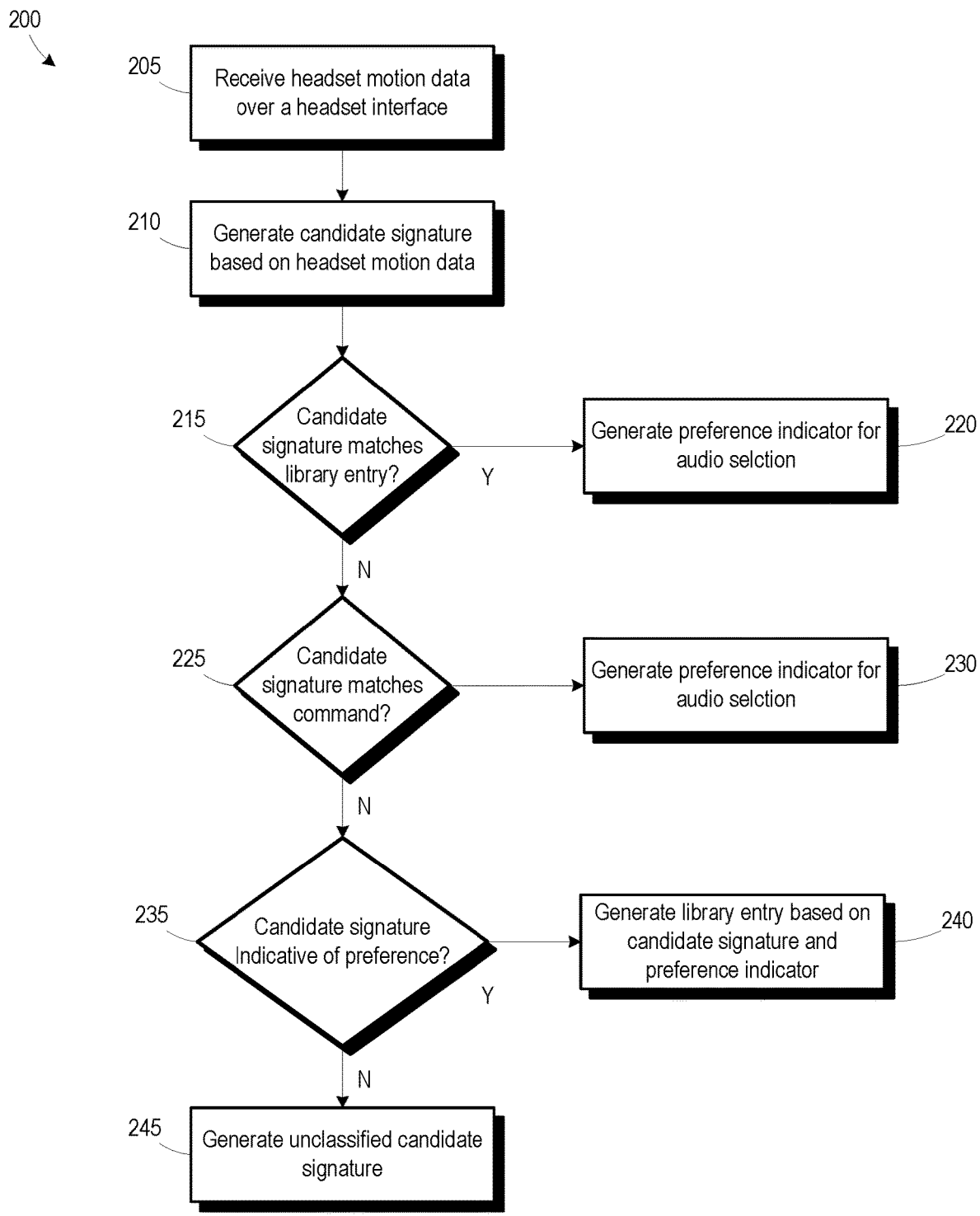
FIG. 2 is a flow diagram of a method for determining audio selection preferences using headset motion data, according to some embodiments disclosed herein.

FIGS. 1-2 illustrate example techniques for monitoring user head motion using motion data collected by a sensor in a headset to determine user preferences regarding the audio selection being played. While a headset interface of the device is engaged, the device monitors the headset motion data to identify preference indicators for the audio selection without requiring the user to manually interact with the device to designate the preference indicator. For example, if the user is bobbing her head in a manner that matches the rhythm of the audio selection, it is likely that the user has a positive preference regarding the audio selection. The motion data may also be used to automatically generate entries in a library of preference classifications for use by the device or other devices to classify audio selections.

FIG. 1 is a simplistic block diagram of a communications system 100 including a device 105. The device 105 implements a computing system 110 including, among other things, a processor 115, a memory 120, a microphone 125, a speaker 130, a motion sensor 132, a headset interface 135 for interfacing with an external headset 140 (e.g., headphones with two ear pieces as illustrated or a single ear headset), and a display 145. The memory 120 may be a volatile memory (e.g., DRAM, SRAM) or a non-volatile memory (e.g., ROM, flash memory, hard disk, etc.). The device 105 includes a transceiver 150 for transmitting and receiving signals via an antenna 155 over a communication link 160. The transceiver 150 may include one or more radios for communicating according to different radio access technologies, such as cellular, Wi-Fi, Bluetooth®, etc. The communication link 160 may have a variety of forms. In some embodiments, the communication link 160 may be a wireless radio or cellular radio link. The communication link 160 may also communicate over a packet-based communication network, such as the Internet. In one embodiment, a cloud computing resource 165 may interface with the device 105 to implement one or more of the functions described herein. The motion sensor 132 (e.g., an accelerometer, magnetometer, mercury switch, gyroscope, compass, or some combination thereof) may measure the position and/or movement of the device 105 relative to a physical reference point or surface.

In some embodiments, the headset interface 135 may include a female connector for receiving a male connector from the headsets 130. In other embodiments, the headset interface 135 may be a wireless interface implemented using the transceiver 150 and the antenna 155 (e.g., Bluetooth®). The headset 140 may include a motion sensor (not separately shown) (e.g., gyroscope, accelerometer, etc.) for generating motion data indicative of a user's head motion.

In various embodiments, the device 105 may be embodied in a handheld or wearable device, such as a laptop computer, a handheld computer, a tablet computer, a mobile device, a telephone, a personal data assistant, a music player, a game device, a wearable computing device and the like. To the extent certain example aspects of the device 105 are not described herein, such example aspects may or may not be included in various embodiments without limiting the spirit and scope of the embodiments of the present application as would be understood by one of skill in the art.

In the device 105, the processor 115 may execute instructions stored in the memory 120 and store information in the memory 120, such as the results of the executed instructions. Some embodiments of the processor 115, the memory 120 and the microphone 125 may be configured to implement a smart audio application 170 and perform portions of a method 200 shown in FIG. 2 and discussed below. For example, the processor 115 may execute the smart audio application 170 to monitor headset motion data received over the headset interface 135 to determine user preferences regarding an audio selection being played over the headset interface 135. One or more aspects of the method 200 may also be implemented using the cloud computing resource 165 in addition to the smart audio application 170.

FIG. 2 is a flow diagram of a method 200 for determining audio selection preferences using headset motion data, according to some embodiments disclosed herein. In one example, various elements of the method 200 shown in FIG. 2 may be implemented on the device 105. In some embodiments, the cloud computing resource 160 (see FIG. 1) may also be used to perform one or more elements of the method 200.

In method block 205, the smart audio application receives motion data over the headset interface 135. In general, the motion data may be received and evaluated during a time period in which an audio selection is being provided over the headset interface 135. In some embodiments, the audio selection may be associated with a music application, a video streaming application, etc.

Upon receiving the motion data in method block 205, the smart audio application 170 generates a candidate signature based on the motion data in method block 210. Techniques for generating signatures based on a signal, such as the motion data signal, are known to those of ordinary skill in the art, so they are not described in detail herein. For example, the signature may be generated in the time domain, the frequency domain, or some combination thereof.

In some embodiments, the smart audio application 170 employs a library 175 (see FIG. 1) of reference motion signatures with known preference classifications. For example, the entries in the library 175 may have an associated "like" or "dislike" classification. In some embodiments, the library 175 may be local to the device 105. In other embodiments, the library may be maintained by the cloud computing resource 165, where the entries may be generated based on data from many different users.

In method block 215, the smart audio application 170 determines if the candidate signature matches an entry in the reference library 175. If a match exists, the smart audio application 170 generates a preference indicator for the audio selection based on the preference classification associated with the matching library entry in method block 220. The preference indicator may be used by the device to tailor the listening experience of the user, for example, by automatically generating playlists of audio selections preferred by the user. In some embodiments, the smart audio application 170 may communicate the preference indicator to a remote service, such as a music streaming service. The music streaming service may also employ the preference indicator to tailor the listening experience of the user when the remote service is active on the device 105.

If the candidate signature does not match an existing reference signature in the library 175, the smart audio application 170 determines if the candidate signature matches a previously defined command signature in method block 225. Predefined head motion signatures may be associated with device commands, such as a skip command, a pause command, a volume control command, a call handling command (e.g., answer or ignore), etc. The device headset motion commands may be default motions, or the user may specify the motions during a training period. The smart audio application 170 executes an identified device command in method block 230.

If the candidate signature does not match an existing reference signature in the library 175 in method block 215 or a command signature in method block 225, it may still be representative of a user's preference and may be employed to generate a new reference entry in the library 175 to dynamically build the library 175.

The smart audio application 170 determines if the candidate signature is indicative of preference in method block 235. In general, the smart audio application 170 assigns a confidence factor to the candidate signature representing a likelihood of the candidate signature indicating a preference if no match is identified. Example techniques for generating the confidence factor are discussed below. If the confidence factor suggests that the candidate signature is indicative of a preference, the smart audio application 170 stores the candidate signature and the generated preference indicator in the library 175 as a reference signature in method block 240. In embodiments where the cloud computing resource 165 maintains the library 175 or its own library, the classified reference signature may be communicated by the smart audio application 170 to the cloud computing resource.

If the smart audio application 170 is not yet able to classify the candidate signature in method block 235, an unclassified candidate signature entry may be added to the library 175 in method block 245.

In some embodiments, to avoid the specifying of a false preference indication, the smart audio application 170 may wait until a particular candidate signature is encountered a number of times during the playing of the audio selection or the smart audio application 170. In some embodiments, the smart audio application 170 may employ other measures of preference indication to generate the confidence factor for the candidate signature. To facilitate this approach, the library 175 may store unclassified candidate signatures, representing unique motion patterns that have been identified, but not yet classified. The unclassified candidate signatures stored in the library 175 may also be associated with a particular audio selection or audio fingerprint generated based on the audio selection.

An incoming candidate signature not matching an existing reference signature may be compared to the unique candidate event signatures in the library 175 to identify a match. If the match is associated with the same audio selection or fingerprint, the confidence factor associated with the unclassified candidate signature may be increased. If the audio selection/fingerprint and candidate signature match a predetermined number of times, the smart audio application 170 may generate a positive preference indicator in method block 240 indicating that the candidate signature is indicative of a preference and store the candidate signature and the generated preference indicator in the library 175 as a reference signature.

In some embodiments, the smart audio application 170 may generate an audio fingerprint for the audio selection and compare the audio fingerprint to the candidate signature. For example, the frequency of the head movement may be matched to a beat of the audio selection defined in the audio fingerprint. A correspondence between the candidate signature and the audio fingerprint is an indication of preference and increases the confidence factor.

Other confidence factors include the presence of the audio selection in a playlist or play loop, the user's other actions during the audio selection, or the time and place. If the user has added the audio selection to a playlist, the confidence factor may be increased. For audio selections in a playlist, the number of repetitions observed prior to generating the preference indicator may be reduced.

In some embodiments, input from the microphone 125 may be employed in generating the preference indicator. If the user is singing or humming during the playing of the audio selection, the confidence factor may be increased.

The time of day or location of the device 105 may also impact the value of a particular unclassified candidate signature as being indicative of preference. If the smart audio application 170 can determine that the device 105 is located at a gym (i.e., the user is working out), the confidence factor may be increased. If the smart audio application 170 determines that the user is likely to be sleeping, the confidence factor may be decreased.

Dynamically building a library of reference signatures, either for a particular user or for a group of users, enhances the user experience by allowing preference data to be collected and audio selections to be automatically classified without requiring a user to manually interact with the device 105. In some embodiments, the user may request a list of audio selections that were automatically classified. The entries from the library 175 may be retrieved and displayed to the user. The user may manually disaffirm any automatically generated preference indicators if the classification is in error.

In some embodiments, one or more aspects of the method 200 may be suppressed based on a motion state of the device 105. Output from the motion sensor 132 may be used to determine device modality (e.g., walking, running, driving, biking, etc.). In general, motion patterns received from the motion sensor 132 are matched by the processor 115 to previously established patterns to determine device modality. If the device modality is determined to be associated with a high degree of head movement, such as running or fast walking, the method 200 may be suppressed. In some embodiments, in addition to or in in lieu of determining device modality, the motion data received over the headset interface 135 may be compared to the motion data collected by the motion sensor 132. If the motion is consistent across both sets of data, it may indicate that the motion of the user's whole body is contributing to the headset motion data (e.g., running or fast walking).

In some embodiments, certain aspects of the techniques described above may be implemented by one or more processors of a processing system executing software. The method 200 described herein may be implemented by executing software on a computing device, such as the processor 115 of FIG. 1, however, such methods are not abstract in that they improve the operation of the device 105 and the user's experience when operating the device 105. Prior to execution, the software instructions may be transferred from a non-transitory computer readable storage medium to a memory, such as the memory 120 of FIG. 1.

The software may include one or more sets of executable instructions stored or otherwise tangibly embodied on a non-transitory computer readable storage medium. The software can include the instructions and certain data that, when executed by one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

A method includes identifying an active state of a first microphone of a device. A signal generated by a second microphone of the device is monitored to identify a voice command trigger phrase. The signal from the second microphone is monitored for a voice command responsive to identifying the voice command trigger phrase. The voice command is executed.

A method includes receiving headset motion data over a headset interface of a device while playing an audio selection on the device. A preference indicator for the audio selection is generated based on the headset motion data.

A device includes a headset interface and a processor coupled to the headset interface. The processor is to receive headset motion data over the headset interface while playing an audio selection over the headset interface and generate a preference indicator for the audio selection based on the headset motion data.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed is:

1. A method comprising:
   employing a first motion sensor in a headset to generate headset motion data;
   receiving the headset motion data over a headset interface of a device while playing an audio selection on the device; and
   generating a preference indicator for the audio selection based on the headset motion data, the preference indicator corresponding to one of a like classification or a dislike classification of the audio selection.

2. The method of claim 1, wherein generating the preference indicator comprises:
   generating a candidate motion signature based on the headset motion data;
   comparing the candidate motion signature to a library of reference motion signatures, each of the reference motion signatures having an associated preference classification; and
   generating the preference indicator based on the associated preference classification of a selected one of the reference motion signatures matching the candidate motion signature.

3. The method of claim 2, further comprising:
generating a confidence factor for the candidate motion signature responsive to the candidate signature not matching a selected one of the reference motion signatures;
generating the preference indictor based on the confidence factor; and
adding the candidate signature and the generated preference indicator to the library.

4. The method of claim 1, wherein generating the preference indicator comprises:
generating a candidate motion signature based on the headset motion data;
communicating the candidate motion signature to a remote resource; and
receiving the preference indicator from the remote resource.

5. The method of claim 1, further comprising communicating the preference indicator to a remote resource.

6. The method of claim 1, further comprising executing a control command for the audio selection based on the headset motion data.

7. The method of claim 6, further comprising:
generating a candidate signature based on the headset motion data;
comparing the candidate signature to a library of reference motion signatures, wherein at least a subset of the reference motion signatures have an associated control command; and
executing the associated control command of a selected one of the reference motion signatures matching the candidate motion signature.

8. The method of claim 6, wherein the control command comprises at least one of a pause command, a skip command, a volume command or a call handling command.

9. The method of claim 1, further comprising:
determining a motion state of the device using motion data from a second motion sensor in the device; and
selectively suppressing the generating of the preference indicator based on the motion state.

10. The method of claim 9, wherein the motion state comprises one of a walking state or a running state.

11. The method of claim 9, wherein determining the motion state comprises determining the motion state based at least on the headset motion data.

12. A device, comprising:
a headset including a first motion sensor to generate headset motion data;
a headset interface connected to the headset; and
a processor coupled to the headset interface, wherein the processor is to receive headset motion data over the headset interface while playing an audio selection over the headset interface and generate a preference indicator for the audio selection based on the headset motion data, the preference indicator corresponding to one of a like classification or a dislike classification of the audio selection.

13. The device of claim 12, wherein the processor is to generate a candidate motion signature based on the headset motion data, compare the candidate motion signature to a library of reference motion signatures, each of the reference motion signatures having an associated preference classification, and generate the preference indicator based on the associated preference classification of a selected one of the reference motion signatures matching the candidate motion signature.

14. The device of claim 13, wherein the processor is to generate a confidence factor for the candidate motion signature responsive to the candidate signature not matching a selected one of the reference motion signatures, generate the preference indictor based on the confidence factor, and add the candidate signature and the generated preference indicator to the library.

15. The device of claim 12, wherein the processor is to generate a candidate motion signature based on the headset motion data, communicate the candidate motion signature to a remote resource, and receive the preference indicator from the remote resource.

16. The device of claim 12, wherein the processor is to communicate the preference indicator to a remote resource.

17. The device of claim 12, wherein the processor is to execute a control command for the audio selection based on the headset motion data.

18. The device of claim 17, wherein the processor is to generate a candidate signature based on the headset motion data, compare the candidate signature to a library of reference motion signatures, wherein at least a subset of the reference motion signatures have an associated control command, and execute the associated control command of a selected one of the reference motion signatures matching the candidate motion signature.

19. The device of claim 17, wherein the control command comprises at least one of a pause command, a skip command and a volume command.

20. The device of claim 12, further comprising a second motion sensor, wherein the processor is to determine a motion state of the device based on data from the second motion sensor and selectively suppress the generating of the preference indicator based on the motion state.

21. The device of claim 20, wherein the motion state comprises one of a walking state or a running state.

22. The device of claim 20, wherein the processor is to determine the motion state based on the headset motion data.

* * * * *